(12) United States Patent
Rittner et al.

(10) Patent No.: US 7,442,238 B2
(45) Date of Patent: Oct. 28, 2008

(54) MEANS FOR AIR FRACTIONIZATION

(75) Inventors: Wolfgang Rittner, Siblin (DE); Rüdiger Meckes, Berkentin (DE); Jürgen Pfennig, Märkische Helde (DE)

(73) Assignee: DAe Systems GmbH, Lübeck (DE)

( * ) Notice: Subject to any disclaimer, the term of this patent is extended or adjusted under 35 U.S.C. 154(b) by 482 days.

(21) Appl. No.: 11/141,118

(22) Filed: May 31, 2005

(65) Prior Publication Data
US 2005/0263005 A1 Dec. 1, 2005

(30) Foreign Application Priority Data
Jun. 1, 2004 (DE) ............... 10 2004 026 647

(51) Int. Cl.
*B01D 53/047* (2006.01)
*B64D 13/06* (2006.01)

(52) U.S. Cl. ............... 96/121; 454/76; 454/77

(58) Field of Classification Search ......... 95/96, 95/128; 96/121, 130; 454/76, 77; 244/129.2; 128/204.18, 205.27
See application file for complete search history.

(56) References Cited

U.S. PATENT DOCUMENTS

| 4,428,372 A | * | 1/1984 | Beysel et al. ........... 128/202.26 |
| 5,069,692 A | | 12/1991 | Grennan et al. |
| 5,323,624 A | | 6/1994 | Schwalm |
| 5,791,982 A | | 8/1998 | Curry et al. |
| 2002/0144679 A1 | | 10/2002 | Cazenave et al. |

FOREIGN PATENT DOCUMENTS

| EP | 0 045 404 | 3/1982 |
| EP | 1 190 945 A1 | 3/2002 |
| EP | 1 273 515 A2 | 1/2003 |
| JP | 3-86699 | 4/1991 |
| WO | WO 2004/074094 A2 | 9/2004 |
| WO | WO 2004/087568 A1 | 10/2004 |

* cited by examiner

*Primary Examiner*—Frank M. Lawrence
(74) *Attorney, Agent, or Firm*—McGlew & Tuttle, P.C.

(57) ABSTRACT

An aircraft, aircraft system and air fractionization device are provided. The air fractionization device is provided for use on board an aircraft. The air fractionization installation functions according to the principle of pressure swing adsorption and is supplied by the air conditioning and pressurization system with which also the aircraft cabin may be supplied with air.

20 Claims, 1 Drawing Sheet

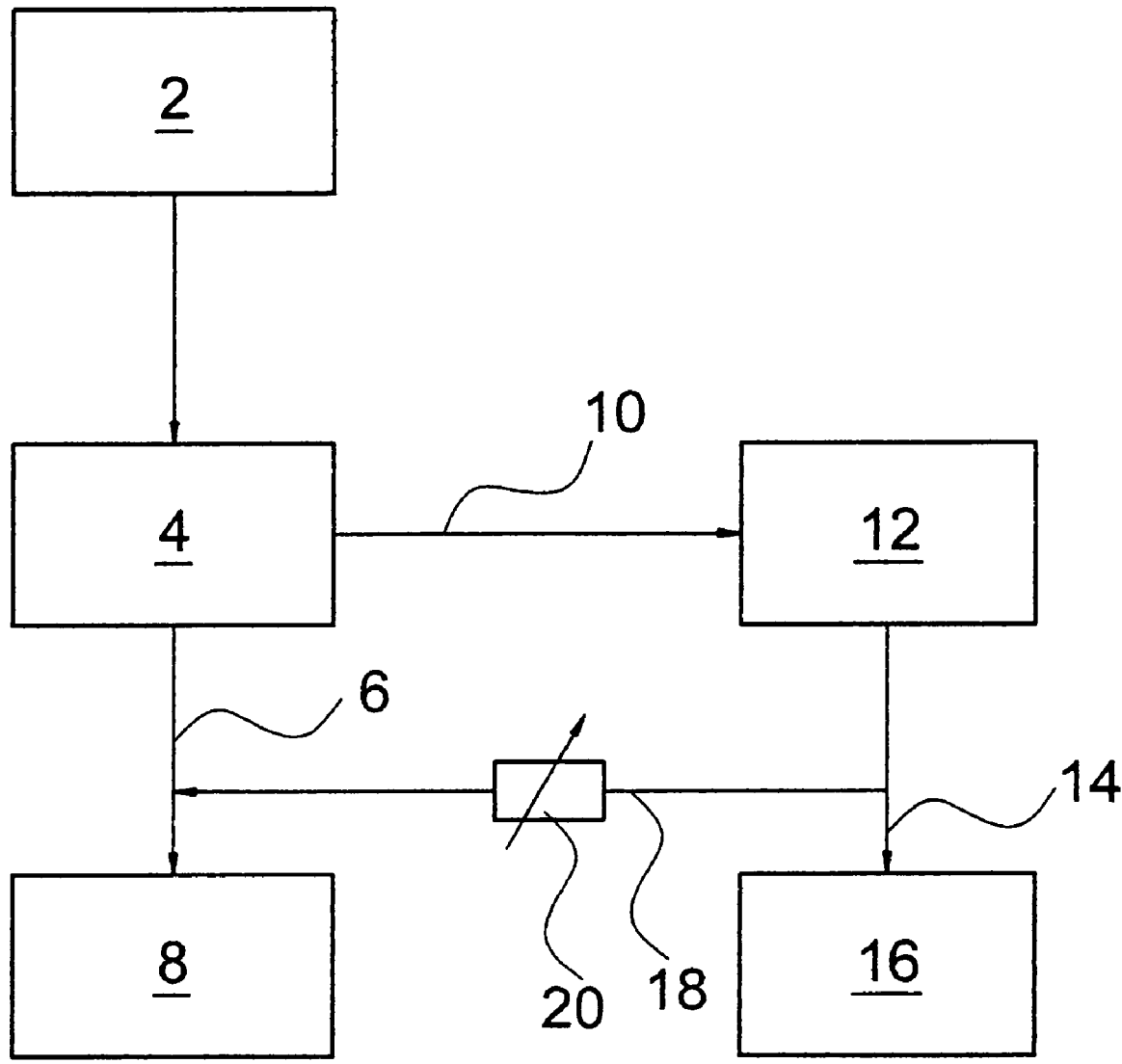

MEANS FOR AIR FRACTIONIZATION

CROSS REFERENCE TO RELATED APPLICATIONS

This application claims the benefit of priority under 35 U.S.C. § 119 of German Application 10 2004 026 647.6 filed Jun. 1, 2004, the entire contents of which are incorporated herein by reference.

FIELD OF THE INVENTION

The invention relates to a means or device for air fractionization on board an aircraft such as for use in passenger aircraft oxygen emergency supply systems which supply the passengers with oxygen in emergency situations.

BACKGROUND OF THE INVENTION

Passenger aircraft comprise oxygen emergency supply systems which supply the passengers with oxygen in emergency situations. The oxygen required for this is carried along in oxygen bottles or oxygen tanks on board the aircraft, or are produced by oxygen production installations during flight.

With regard to the known oxygen production installations on board aircraft, it is the case of air fractionization installations which function according to the principle of pressure swing adsorption. These air fractionization installations usually require pressurized air which is made available by the main or auxiliary power plant of the aircraft, or by separate pressurized air producers. The disadvantage with the use of power plant air is the fact that this is very hot, is at a high pressure and is loaded with water to a too great extent, so that it needs to be prepared/treated with much effort before it may be led to the pressure swing adsorption installation. The air fractionization installation thus becomes very complicated with regard to technology and construction on account of this.

SUMMARY OF THE INVENTION

Proceeding from this, it is the object of the present invention to provide a means, device or system for air fractionization which does not have these disadvantages and may be realized without great effort with regard to design, and in an inexpensive manner.

According to the invention, a device and system for air fractionization on board an aircraft is provided. The means or system comprises an air conditioning and pressurization system for the supply of breathing air to the aircraft cabin and the device for air fractionization. The means or air fractionization device is supplied with air from the air conditioning and pressurization system for the aircraft cabin.

The means according to the invention for the fractionization of air on board an aircraft in an advantageous manner is supplied with air from the air conditioning and pressurization system for the aircraft cabin, so that no units are required for the treatment (preparation) of the air with regard to pressure, temperature and humidity.

In the air conditioning and pressurization system, the pressurized air which is led to this is conditioned with respect to the pressure, temperature and water content, according to the conditions required in the aircraft cabin, which means to say that the water is removed from air in the air conditioning and pressurization system, and the temperature and the pressure of the air is adapted to the cabin conditions.

A part flow of the air conditioned in this manner is diverted from the air conditioning and pressurization system and led to the means for air fractionization. The remaining part of the air of the air conditioning and pressurization system continues to be led to the aircraft cabin.

The air diverted from the air conditioning and pressurization system is fractionized into its main constituents of nitrogen and oxygen in the means for air fractionization. With this, the air in the pressure swing adsorption units, under pressure, flows through a molecular sieve on which the nitrogen is bonded in an adsorptive manner; whilst the oxygen passes through the molecular sieve. In this manner the desired separation of nitrogen and oxygen is effected. After a certain time, the adsorption capability of the molecular sieve is exhausted so that a regeneration (desorption) of the loaded adsorber is required. In order, in the means for air fractionization, to be able to ensure an adsorptive air separation with a continuous supply of the product, at least two pressure swing adsorption units need to be operated in a parallel manner of which in each case one separates the air constituents whilst the other is simultaneously regenerated.

The oxygen which is separated by the means for air fractionization is led to the oxygen supply system of the aircraft in emergency situations or when required. During normal flight operation, the oxygen and/or the nitrogen separated by the means for air fractionization is led into the aircraft cabin and, where appropriate nitrogen is also led away out of the aircraft. For this reason, the means for air fractionization advantageously comprises an outlet through which the oxygen and/or nitrogen may be diverted into the aircraft cabin. In this manner the oxygen component (share) of the cabin air may be increased, wherein the oxygen component may be increased with an increasing flight altitude. By way of this oxygen enrichment of the cabin air, the risk of jet lag may be reduced. Furthermore the perceived comfort during the flight is improved.

Advantageously the means for air fractionization comprises a further outlet through which the nitrogen may be diverted into the fuel tanks and/or the freight space. The leading of the nitrogen into the fuel tanks and the freight space minimizes the risk of fire on board the aircraft. The nitrogen enrichment of the air located in the fuel tanks and the freight space reduces the partial pressure of the oxygen located in this air, so that for example in the fuel tanks, the danger of ignition of the kerosene vapour located in these tanks is reduced accordingly.

In order to be able to set the oxygen and/or nitrogen flow led to the aircraft cabin, the means for air fractionization usefully comprises at least one control valve. The air composition in the aircraft cabin may be changed according to flight conditions, for example the flight altitude, with the help of this control valve.

The invention is hereinafter explained by way of an embodiment example represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The Figure is a schematic diagram showing the system and device for air fractionization on board an aircraft.

DESCRIPTION OF THE PREFERRED EMBODIMENTS

Referring to the drawings in particular, a pressurized air source 2 is represented in the figure which is connected to an air conditioning and pressurization system 4 and supplies this with compressed air. With regard to the pressurized air source 2 it is generally the case of a high-pressure and medium-pressure compressor of the main power plant of the aircraft or of an auxiliary turbine.

The compressed air leaves the pressurized air source 2 at a temperature of approx. 300° C. For this reason heat-exchangers (not shown) are provided in the air-conditioning and pressurization system, which cool the air to cabin temperature. At low flight altitudes, in particular when flying through clouds, the external air which is accommodated by the turbines may be heavily laden with water. This water is removed from the air in the air conditioning and pressurization system 4 with the help of a water separator (extractor) which is not shown in the figure. Furthermore the compressed air in the air conditioning and pressurization system 4 is relieved to the required cabin pressure.

A part of the air conditioned in this manner leaves the air conditioning and pressurization system 4 through a first outlet 6 and is led to the cabin region 8 of the passenger aircraft for building up the cabin pressure and for conditioning.

A second part-flow of the air conditioned by the air conditioning and pressurization system 4 is supplied to a means for air fractionization 12 via a second outlet 10 on the air conditioning and pressurization system 4. The means for air fractionization 12 comprises pressure swing adsorption units (not shown) in which the air is fractionized into its main constituents of nitrogen and oxygen. For reasons of stability the pressure swing adsorption units may be in permanent operation during the complete flight duration.

The nitrogen and oxygen which is separated by the pressure swing adsorption units are led further to a consumer 16 via a first outlet 14 of the means for air fractionization 12. With regard to the consumer 16 in the case of the emergency oxygen supply of the aircraft as the consumer 16, almost pure oxygen is supplied. In the case of the fuel tanks and/or the freight space may be flushed with the nitrogen separated from the means for air fractionization 12 for reducing the risk of fire.

The means for air fractionization 12 comprises a first outlet 18. Via this outlet 18, the cabin region 8 during normal flight operation is supplied with additional oxygen and preferably other regions such as e.g. the freight space and the fuel tanks with nitrogen. The supply conduit of the outlet 18 comprises a control valve 20 in order to be able to adjust (set) the volume flow of oxygen or nitrogen. The control valve 20 may also be activated by control electronics of the air conditioning and pressurization system 4 in order for example to increase the partial pressure of the oxygen in the cabin air.

While a specific embodiment of the invention has been shown and described in detail to illustrate the application of the principles of the invention, it will be understood that the invention may be embodied otherwise without departing from such principles.

APPENDIX

List of Reference Numerals
2 pressure source
4 air conditioning and pressurization system
6 outlet
8 cabin region
10 outlet
12 means for air fractionization
14 outlet
16 consumer
18 outlet
20 control valve

What is claimed is:

1. A device for air fractionization on board an aircraft for the supply of breathing air to the aircraft cabin, the device comprising:
    an air conditioning and pressurization system receiving untreated compressed air, said air conditioning and pressurization system having a first outlet and a second outlet, said air conditioning and pressurization system supplying breathing air to the aircraft cabin via said first outlet;
    an air fractionization unit having an air fractionization intake supplied with breathing air from said air conditioning and pressurization system via said second outlet, said air fractionization unit having an air fractionization outlet for delivering nitrogen and/or oxygen to said first outlet, wherein said nitrogen and/or oxygen is delivered to the aircraft cabin via said first outlet of said air conditioning and pressurization system.

2. A device for air fractionization according to claim 1, further comprising: at least two pressure swing adsorption units.

3. A device for air fractionization according to claim 1, wherein said oxygen and/or nitrogen is diverted into the aircraft cabin based on an oxygen concentration of said breathing air supplied via said air conditioning and pressurization system.

4. A device for air fractionization according to claim 1, further comprising: an outlet through which nitrogen may be diverted into the fuel tanks and/or the freight space.

5. A device for air fractionization according to claim 1, further comprising: a control valve with which a flow of the oxygen and/or the nitrogen to the aircraft cabin may be adjusted.

6. An aircraft system, comprising:
    a compressed air supply means for supplying non-conditioned compressed air;
    a cabin air conditioning and pressurization system having an inlet for receiving said non-conditioned compressed air from said compressed air supply means and a first outlet and a second outlet, said cabin air conditioning and pressurization system dehumidifying and pressurizing said non-conditioned compressed air to form breathable air, said cabin air conditioning and pressurization system supplying said breathable air to an aircraft cabin region via said first outlet; and
    an air fractionization device with an intake supplied with breathable air from said second outlet of said cabin air conditioning and pressurization system, said air fractionization device separating said breathable air into nitrogen and oxygen, said air fractionization device delivering one of said nitrogen and oxygen to said first outlet.

7. An aircraft system according to claim 6, wherein said air fractionization device includes at least two pressure swing adsorption units.

8. An aircraft system according to claim 7, wherein said air fractionization device includes an outlet through which oxygen and/or nitrogen may be diverted into the aircraft cabin.

9. An aircraft system according to claim 7, wherein said air fractionization device includes an outlet through which nitrogen may be diverted into the fuel tanks and/or the freight space.

10. An aircraft system according to claim 6, wherein said air fractionization device includes a control valve with which the oxygen and/or the nitrogen supplied to the aircraft cabin may be adjusted.

11. An aircraft, comprising:
- a cabin region;
- a compressed air source for supplying unconditioned compressed air;
- a cabin air conditioning and pressurization system receiving unconditioned compressed air from said compressed air source, said cabin air conditioning and pressurization system having a first outlet and a second outlet, said cabin air conditioning and pressurization system treating said unconditioned compressed air to produce breathing air, said cabin air condition and pressurization system delivering said breathing air to said cabin region via said first outlet; and
- an air fractionization device with an intake supplied with breathing air from said second outlet of said cabin air conditioning and pressurization system, said air fractionization device separating said breathing air into oxygen and nitrogen, said air fractionization device delivering oxygen and/or nitrogen to said first outlet of said cabin air conditioning and pressurization system such that said breathing air and said oxygen and/or nitrogen are supplied to said cabin region.

12. An aircraft according to claim 11, wherein said air fractionization device includes at least two pressure swing adsorption units.

13. An aircraft according to claim 11, wherein said air fractionization device includes an outlet through which oxygen and/or nitrogen may be diverted into the aircraft cabin.

14. An aircraft according to claim 11, wherein said air fractionization device includes an outlet through which nitrogen may be diverted into the fuel tanks and/or the freight space.

15. An aircraft according to claim 11, wherein said air fractionization device includes a control valve for varying the oxygen and/or the nitrogen delivered to the aircraft cabin.

16. An aircraft system according to claim 6, wherein said oxygen and/or nitrogen is diverted into the aircraft cabin based on an oxygen concentration of said breathing air supplied via said cabin air conditioning and pressurization system.

17. An aircraft according to claim 11, wherein said oxygen and/or nitrogen is diverted into the aircraft cabin with said breathing air based on an oxygen concentration of said breathing air supplied via said cabin air conditioning and pressurization system.

18. A device for air fractionization according to claim 1, wherein said air fractionization unit functions as a pressure swing adsorption device.

19. An aircraft system according to claim 6, wherein said air fractionization device functions as a pressure swing adsorption device.

20. An aircraft according to claim 11, wherein said air fractionization device functions as a pressure swing adsorption device.

* * * * *